United States Patent [19]

Roecker

[11] Patent Number: 5,662,030
[45] Date of Patent: Sep. 2, 1997

[54] DEVICE FOR BAKING HOLLOW PASTRY GOODS

[76] Inventor: Hans Roecker, Bleidenroeder Strasse 11, D-35315 Homberg/Ohm, Germany

[21] Appl. No.: 648,019

[22] PCT Filed: Dec. 2, 1994

[86] PCT No.: PCT/EP94/04019

§ 371 Date: May 31, 1996

§ 102(e) Date: May 31, 1996

[87] PCT Pub. No.: WO95/15086

PCT Pub. Date: Jun. 8, 1995

[30] Foreign Application Priority Data

Dec. 2, 1993 [DE] Germany ............ 93 18 422.0 U

[51] Int. Cl.⁶ ............................................. A21C 9/00
[52] U.S. Cl. ......................................... 99/450.6; 99/441
[58] Field of Search ............................ 99/382, 426, 428, 99/441, 442, 450.6; 432/124

[56] References Cited

U.S. PATENT DOCUMENTS

| | | | |
|---|---|---|---|
| 3,410,691 | 11/1968 | Stanley | 99/88 |
| 3,424,076 | 1/1969 | Bernatz et al. | 99/416 |
| 3,934,043 | 1/1976 | Haas, Sr. et al. | 99/450.6 |
| 4,303,690 | 12/1981 | Haas, Sr. et al. | 99/383 |
| 4,694,741 | 9/1987 | Haas, Sr. et al. | 99/354 |

FOREIGN PATENT DOCUMENTS

| | | |
|---|---|---|
| 0 350 529 | 1/1990 | European Pat. Off. . |
| 2 413 353 | 10/1974 | Germany . |
| 35 15 532 | 11/1985 | Germany . |
| 38 33 394 | 4/1990 | Germany . |
| 41 11 012 | 6/1992 | Germany . |
| WO94/12035 | 6/1994 | WIPO . |

*Primary Examiner*—Henry Bennett
*Assistant Examiner*—Gregory A. Wilson
*Attorney, Agent, or Firm*—Foley & Lardner

[57] ABSTRACT

The invention pertains to a device used for baking hollow pastry goods, where one or more strips of dough are wound on a hollow body prior to baking. The hollow body consists of elastic wire coils that form a spiral structure.

18 Claims, 1 Drawing Sheet

DEVICE FOR BAKING HOLLOW PASTRY GOODS

DESCRIPTION

The invention relates to a device for baking hollow pastry goods according to the preamble of claim 1.

Devices of this type are used to bake, for example, Schillerlocken [Schiller horns] or Mozartrollen [Mozart rolls]. Schiller horns have a conical cavity which is filled with an edible filling (with cream or the like), Mozart rolls have an approximately cylindrical cavity which is likewise filled with an edible filling.

The prior-art molds consist of sheet metal which is, for example, in the form of a cylinder or cone. The mold is open at the ends, with the result that the hot air can stream through the cavity of the mold during baking. The sheet metal which is bent to form the mold either has its edges flanged together along a surface line or the pieces of sheet metal may simply be allowed to abut here, with the result that a small air gap remains between them. The dough cut into strips, for example a puff-pastry dough, is wound helically onto a mold of this type such that the edges of the strips overlap when they are wound on. This mold around which the dough has been wound is placed in the oven and is exposed to baking heat here. During baking, the dough puffs up, with the result that the Schiller horns or Mozart rolls attain their typical shape.

However, the sheet-metal mold prevents the oven heat from having a uniform effect on the dough during baking since the heat only passes from the inside to the dough of the baking pastry by virtue of heat conduction via the sheet metal of the mold. Consequently, the dough is heated more strongly on the outside than on the inside. This results in non-uniform baking. Added to this is the fact that, due to the dough swelling up during baking, the dough is positioned over the edges of the mold, with the result that, once the dough has been baked, it is difficult to remove the mold from the baked pastry. Consequently, the end of the baked dough is often torn off when the mold is removed, and it is possible here for the entire baked pastry to be destroyed, in particular if it consists of puff pastry. An attempt has already been made to remedy this by not winding up the strips of dough as far as the ends of the mold. Consequently, the baked pastry is shorter or the mold has to be made longer, as a result of which space in the oven is lost during baking. An attempt has thus also already been made to remedy this by coating the dough, in particular at its ends, preferably With egg yolk prior to baking in order that the dough does not expand to the sides. However, the disadvantage with this measure is that the egg yolk, and thus the baked pastry, sticks fast to the mold at the points where the egg yolk is in contact with the mold and the baked pastry, that is to say the ends, here the baked pastry [sic], with the result that, once again, there are difficulties in removing the mold from the baked pastry.

The technical problem of the present invention is to specify a mold for hollow pastry, in particular for baking Schiller horns or Mozart rolls, which can be removed easily, that is to say without difficulty, from the baked pastry after baking without destroying or damaging said baked pastry.

This object is achieved by the characterizing feature of claim 1. Since an elastic wire which is wound helically to form the desired inner shape is now used as the mold, it is possible, after baking, for the wire to be extracted from the baked pastry by turning in the manner of a screw. Since the wire and thus the coils are elastic, their diameter decreases upon extraction from the baked pastry, with the result that the diameters of the wire coils become increasingly smaller towards the end, turning of the helix causing the first wire coils to be released immediately from the interior of the baked pastry, but the further wire coils to be released only gradually. After a few helical turns, the entire wire helix can be drawn out of the baked pastry in an axial direction.

For this purpose, the last wire coil usually having the largest diameter advantageously terminates in a handle. For this purpose, the wire need only be extended and bent in such that it is arranged, for example, along the diameter of the last wire coil or is advantageously bent out of the plane of the last wire coil as a handle, advantageously in the form of a semicircle or ellipse [sic].

The wire itself expediently consists of stainless steel. However, it is also possible to use, as the wire, a heat-resistant plastic wire, as long as the latter is sufficiently elastic and, after baking, can be extracted from the baked pastry by turning.

Further details of the invention can be gathered from the subclaims.

An exemplary embodiment of the invention is represented in the drawing, to be precise:

Figure 1:
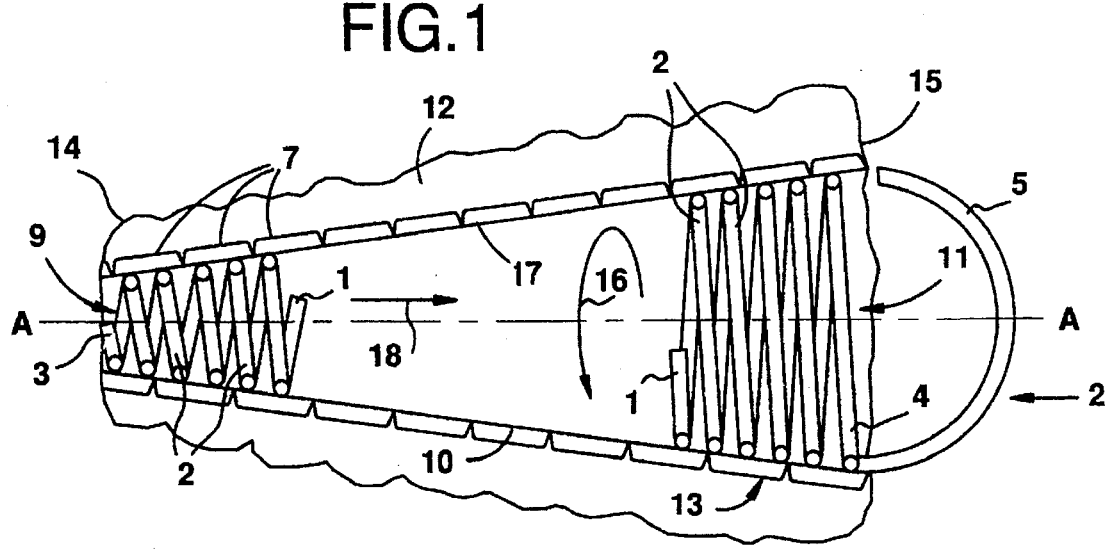
FIG. 1 shows a first exemplary embodiment.

According to FIG. 1, an elastic wire (1) is wound helically to form a helix (13), that is to say the helix (13) follows the surface of a truncated cone (10). The coils (2) of the helix (13) are spaced apart from one another. The truncated cone (10) formed by the wire coils (2) has an opening (9) at its left-hand end and an opening (11) at its right-hand end. The dough cut into strips (7) is wound onto the helix (13).

During baking, the hot air can stream through the wire helix (13) on one side, and it passes between the coils (2) of the helix (13) to the baking dough (17) from the inside. In the same manner, the strips (7) of dough are also exposed to the influence of the oven heat from the outside.

During baking, the puffs swells up, with the result that it assumes the baked-pastry shape (12), which, according to FIG. 1, corresponds to a Schiller horn. The ends (14, 15) of the Schiller horn may pass over the last coils (3, 4) of the helix (13) and position themselves over these coils.

In order, after baking, to remove the helix (13) from the baked pastry, the last coil (4) (coil with the largest diameter) terminates, by way of an extension of the wire, in a handle (5). The handle (5) is located in the plane of the last wire coil (4) and is bent over in the form of a semicircle or half-ellipse in order to provide a good grip. In order to remove the helix (13) from the baked pastry (12), the helix (13) is turned, around the axis A—A of the helix (13), in the direction of the arrow (16). Due to the elasticity of the wire (1) used, at least the coils in the vicinity of the handle (5) become smaller, with the result that the helix (13) can be removed from the baked dough even at the point where the latter has positioned itself over the end (15).

Figure 2:
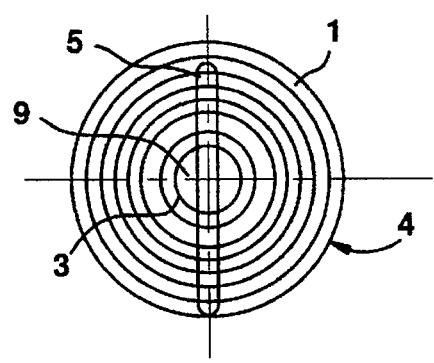
FIG. 2 shows the view of FIG. 1 in the direction of the arrow II.
Figure 3:
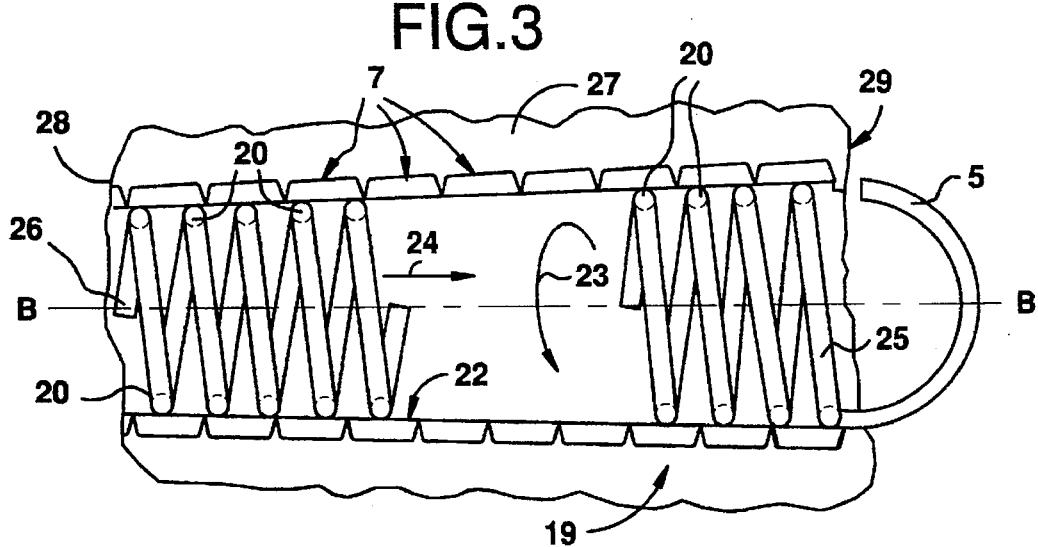
FIG. 3 shows a modified exemplary embodiment.

FIG. 3 shows a helix (19) whose coils (20) approximately follow the surface of the cylinder (22). The cylinder (22) is tapered slightly towards the left-hand end of the helix (19). The last coil (26) of the helix (19) once again leaves an opening free, as does the last coil (25) at the right-hand end of the helix (19). The last coil (25) once again terminates, by way of a wire extension, in a handle (5) according to FIGS. 1 and 2. If strips (7) of dough are arranged on the helix (19), it is once again possible for the air to stream into the interior of the helix (19) from the left-hand end and from the right-hand end of the same and to pass between the coils (20) onto the wound-up strips (7) of dough from the inside. During baking, the dough puffs up to the baked-pastry shape (27), it being possible for the baked dough at the ends (28, 29) once again, as in FIG. 1, to position itself over the end coils (25, 26).

In order to remove the helix (19) from a Mozart roll baked in this way, the helix (19) is once again turned with the aid of the handle (5), around the longitudinal axis B—B, in the direction of the arrow (23). In the process, the helix is extracted from the baked pastry by turning in the manner of a screw. At the same time, the diameter of the coils (20) being released from the baked pastry is reduced once again, with the result that the helix (19) can be removed from the baked pastry in the direction of the arrow (24) without the pastry being damaged.

The advantage with this helical design of the mold is that the mold on which the dough has been wound in the form of strips can be easily removed from the baked pastry without damaging the latter. A further fundamental advantage is that the baking heat reaches the baking dough extremely uniformly from all sides if the wire coils have an air gap between them, this resulting in uniform baking and uniform browning.

List of designations

| | |
|---|---|
| 1 | Wire |
| 2 | Wire coils |
| 3 | Narrowest wire coil |
| 4 | Largest wire coil |
| 5 | Handle |
| 7 | Strips of dough |
| 9 | Opening |
| 10 | Truncated cone |
| 11 | Opening |
| 12 | Baked pastry |
| 13 | Helix |
| 14 | Ends of the baked dough |
| 15 | Ends of the baked dough |
| 16 | Arrow |
| 17 | Inner surface of the baking dough |
| 18 | Arrow |
| 19 | Helix |
| 20 | Wire coils |
| 22 | Cylinder |
| 23 | Arrow |
| 24 | Arrow |
| 25 | Last wire coil on the right |
| 26 | Last wire coil on the left |
| 27 | Shape of the baked dough |
| 28 | End of the baked pastry |
| 29 | End of the baked pastry |
| 10, 22 | Hollow body |
| A—A | Axis |
| B—B | Axis |

I claim:

1. Device for baking hollow pastry goods, in the case of which one or more strips of dough are wound onto a hollow body prior to baking, characterized in that the hollow body (10, 22) comprises helically arranged, elastic wire coils (2, 21).

2. Device according to claim 1, characterized in that the wire coils (2, 21) have an air gap between them.

3. Device according to claim 1, characterized in that the wire coils (2) follow the surface of a truncated cone (10).

4. Device according to claim 1, characterized in that the wire coils (21) follow the surface of a cylinder (22).

5. Device according to claim 4, characterized in that, towards one end, the cylinder (22) is designed to taper slightly.

6. Device according to claim 1, characterized in that the last wire coil (4, 25) at the end of the largest diameter of the hollow body (10, 22) terminates in a handle (5).

7. Device according to claim 6, characterized in that the handle (5) comprises an extension of the wire of the last coil (4, 25).

8. Device according to claim 7, characterized in that the wire piece designed as the handle (5) is arranged approximately along the diameter of the last wire coil (4, 25).

9. Device according to claim 7, characterized in that the wire piece designed as the handle (5) is bent out of the plane of the last wire coil (4, 25).

10. Device according to claim 9, characterized in that the wire piece designed as a handle (5) runs approximately in the form of a semicircle or half-ellipse with respect to the plane of the last wire coil (4, 25).

11. Device according to claim 1, characterized in that the wire coils (2, 21) run helically to the last, narrowest wire coil (3, 26).

12. Device according to claim 1, characterized in that the wire diameter is from 1.5 to 4 mm.

13. Device according to claim 1, characterized in that the wire coils (2, 21) are spaced apart from one another at least by the thickness of the wire (1) used.

14. Device according to claim 1, characterized in that the wire (1) consists of a stainless steel.

15. Device according to claim 1, characterized in that the wire (1) consists of a heat-resistant plastic material.

16. Device according to claim 1, characterized in that the wire (1) is flexurally elastic.

17. Device according to claim 1, characterized in that the wire coils (2, 21) have a non-stick coating.

18. Device according to claim 17, characterized in that the wire coils (2, 21) have a coating of Teflon (tradename).

* * * * *